(12) United States Patent
Kim et al.

(10) Patent No.: US 6,901,963 B2
(45) Date of Patent: Jun. 7, 2005

(54) MICRO FLUIDIC DEVICE FOR CONTROLLING FLOW TIME OF MICRO FLUID

(75) Inventors: Sung Jin Kim, Daejon (KR); Yong Beom Shin, Daejon (KR); HaeSik Yang, Daejon (KR); Dae Sik Lee, Daejon (KR); Kyu Won Kim, Daejon (KR); Se Ho Park, Daejon (KR); Yun Tae Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/731,211

(22) Filed: Dec. 8, 2003

(65) Prior Publication Data
US 2004/0231736 A1 Nov. 25, 2004

(30) Foreign Application Priority Data
May 22, 2003 (KR) ................................ 10-2003-0032527

(51) Int. Cl.[7] ................................................ F15B 21/00
(52) U.S. Cl. ....................... 137/833; 137/806; 251/368; 604/201
(58) Field of Search ............................... 137/833, 806; 251/368; 204/601

(56) References Cited

U.S. PATENT DOCUMENTS

| | | | | |
|---|---|---|---|---|
| 3,191,623 A | * | 6/1965 | Bowles | .................. 137/833 |
| 4,426,451 A | * | 1/1984 | Columbus | ................... 436/518 |
| 4,676,274 A | * | 6/1987 | Brown | ....................... 137/806 |
| 6,271,040 B1 | | 8/2001 | Buechler | |
| 6,296,020 B1 | * | 10/2001 | McNeely et al. | ........... 137/806 |
| 6,676,835 B2 | * | 1/2004 | O'Connor et al. | .......... 210/542 |

OTHER PUBLICATIONS

Jr–Hung Tsai, et al., Active microfluidic mixer and gas bubble filter driven by thermal bubble micropump, Sensors and Actuators A 97–98, 2002, pp. 665–671.

J. Kohnle, et al., A Unique Solution for Preventing Clogging of Flow Channels by Gas Bubbles, IEEE, 2002 pp. 77–80.

* cited by examiner

*Primary Examiner*—A. Michael Chambers
(74) *Attorney, Agent, or Firm*—Blakely Sokoloff Taylor & Zafman (57) ABSTRACT

Provided is a micro fluidic device that can control a flow time of micro fluid by using a capillary phenomenon. The micro fluidic device includes: a flow channel for flowing fluid, the flow channel being formed between a top substrate and a bottom substrate or between a top substrate, a bottom substrate, and a middle substrate; a flow blocking surface for stopping a flow of the fluid in the flow channel temporarily; and a hump for delaying the flow formed in the line of continuity with the flow blocking surface. The micro fluidic device of the present research can control the flow time in a simple manner.

8 Claims, 15 Drawing Sheets

MICRO FLUIDIC DEVICE FOR CONTROLLING FLOW TIME OF MICRO FLUID

FIELD OF THE INVENTION

The present invention relates to a micro fluidic device that can be applied to an automatic micro analysis system, such as biosensors, biochips and high throughput screening (HTS), and a combinatory chemistry system; and, more particularly, to a micro fluidic device that can delay a flow time of micro fluid in a micro fluidic network. These systems have a complicated micro fluidic network in which a plurality of flow channels are meeting and diverged. The micro fluidic network requires valves for stopping the flow of the fluid in each micro fluidic unit as well as pumps for making the fluid flow. Various phenomena occur in places where the flow channels meet or diverged.

DESCRIPTION OF RELATED ART

When two different micro fluids come across in a flow channel, one of the fluids passes a confluence junction first and the other fluid passes the confluence junction. In this process, air bubbles may be generated due to an air layer formed between the fluid that passes the confluence junction first and the fluid that passes it later. Since, the latter fluid needs additional pressure to proceed ahead, the formation of air bubbles should be prevented or the fluid should be able to be flown even after the generation of the air bubbles. So far, known are a method of preventing the formation of air bubbles by forming holes for draining the air bubbles and a method of forming passages for fluids and air bubbles differently by forming flow channels having different cross sections.

U.S. Pat. No. 5,904,424 suggests a structure where a tube for draining air is formed at a fluid confluence junction additionally, other than flow channels. In this structure, the generation of air bubbles can be prevented only in a spot where two flow channels meet. However, since additional tubes and holes for draining air should be formed, the structure becomes very complicated. Moreover, this method can hardly be applied to a case where more than three flow channels meet together in a confluence junction, and the area of the micro fluidic device is large due to the volume of the additional holes.

A paper, "Active Microfluidic Mixer and Gas Bubble Filter Driven by Thermal Bubble Micropump," published by Jr-Hung Tsai et al. of Berkeley University in Sensors and Actuators A, February 2002, discloses a structure where flow channels having different cross sections are formed and air is drained through a flow channel having a larger cross section while fluid is flown though a flow channel having a smaller cross section. This method, either, does not prevent the generation of air bubbles and it should have additional tubes formed to drain air, thus making the structure complex and hardly applied to a case where more than two flow channels meet together.

Another paper "A Unique Solution for Preventing Clogging of Flow Channels by Gas Bubbles," published by J. Kohnle et al., in MEMS 2002 proceeding, pp. 77–80, suggests a method of forming flow channels with different cross sections in three-dimensional and then draining air through a flow channel having a larger cross section while flowing fluid through a flow channel having a smaller cross section. Since the flow channels should be formed in three-dimensional, it is complicated and the generation of air bubbles at confluence junctions cannot be prevented.

All the above-mentioned technologies have shortcomings that they do not prevent the generation of air bubbles at confluence junctions and the structures and fabrication processes are complicated. Also, if the flow channels are contaminated and blocked and fluid cannot proceed any further, additional flow channel should be formed to make the fluid flow. In short, when two flow channels meet, fluid that has arrived at a confluence junction first should be delayed in the confluence junction and pass though the confluence junction after a necessary time is passed, even though another fluid does not arrive at the confluence junction. However, until now, no flow channel having valves that uses time delay is suggested.

It takes a few minutes to tens of minutes to induce chemical reaction between different fluids, between identical fluids, or between solid and fluid in a reaction chamber. The fluid passes through the reaction chamber and stops flowing at a valve. Then, when the reaction is completed, it starts flowing through the valve. To make the fluid stop at the valve and then flow again, a mechanically- or electrically-operated valve and an additional pump are required. If you want a simple system and you don't want to set up any mechanically- or electrically-operated valve, the flow of fluid should be able to be delayed for a predetermined time at a line-end of the reaction chamber during the reaction time and then flown out of the reaction chamber automatically, when the reaction is completed. This process can be performed by utilizing a capillary-based pressure barrier.

In U.S. Pat. No. 6,271,040 B1, the flow of the fluid is delayed by forming a hydrophobic three-dimensional pressure barrier at a region where the fluid should delay flowing. However, the delay time is just as short as two minutes, which is not sufficient for reactions, such as deoxyribonucleic acid (DNA) amplification, hybridization and antigen-antibody reaction, in the reaction chamber. Moreover, the pressure barrier should be formed in three-dimensional and hydrophobic surface modification, the fabrication process is complicated.

SUMMARY OF THE INVENTION

It is, therefore, an object of the present invention to provide a micro fluidic device that can delay a flow of fluid for a predetermined time by using a simple principle and a simple structure.

In accordance with the present invention, a flow time of micro fluid can be delayed as long as required at a desired spot in order to suppress generation of air bubbles. Also, in a confluence junction where more than two fluids meet, if one flow channel is blocked, the fluid can flow to another flow channel. Besides, the micro fluidic device of the present invention can control a flow time of the fluid and delay the flow time for a chemical reaction between different or identical fluids, or between solid and fluid in a reaction chamber.

In accordance with an aspect of the present invention, there is provided a micro fluidic device utilizing a capillary phenomenon and including: a flow channel for flowing fluid, the flow channel being formed between a top substrate and a bottom substrate; a flow blocking surface for stopping a flow of the fluid in the flow channel temporarily; and a hump for delaying the flow formed in the line of continuity with the flow blocking surface.

The micro fluidic device of the present invention utilizes the capillary pressure to flow the fluid or applies additional pressure from the outside to the fluid. The flow of fluid is delayed by a capillary pressure barrier which is generated by an aspect ratio of the flow channel at the flow blocking surface and a flow delay angle between the flow blocking surface and the hump for delaying the flow. The delay time of the flow can be adjusted delicately by a length of the hump for delaying the flow.

The flow channel is formed with the top and bottom substrates, and the top and bottom substrates are formed of hydrophilic materials, hydrophobic materials, and/or a combination thereof.

The flow delay time is automatically determined based on the properties of a fluid, materials forming the top and bottom substrates, an aspect ratio of a flow channel, a size of the flow delay angle, and a length of the hump for delaying the flow.

In short, the flow can be delayed as long as required by determining the kind of the top and bottom substrates and the fluid and designing the width-height aspect ratio of the flow blocking surface, a length of the hump for delaying the flow, and the flow delay angle between the proceeding direction of the flow channel and the hump for delaying the flow properly.

In accordance with another aspect of the present invention, there is provided a micro fluidic device that can control a flow time of fluid, the micro fluidic device including: a first flow channel for flowing a first fluid; a second flow channel for flowing a second fluid; a first flow blocking surface and a second flow blocking surface, each connected to the first flow channel and the second flow channel; and a hump for delaying the flow which is formed in a line of continuity with the first and second flow blocking surfaces.

By controlling the pressure deference before and after the flow blocking surfaces, one fluid among the fluids flown through the first or second flow channel arrives at the flow blocking surface first and stops temporarily until the other fluid arrives there. Even though the other fluid does not arrive, the first-come fluid can stop temporarily and pass through the flow blocking surface after a predetermined time. The micro fluidic device may be formed to include a plurality of micro fluidic units in parallel or in serial, each of the micro fluidic units including the flow blocking surface and the hump for delaying the flow, individually.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. The embodiments of the present invention can be modified variously. Thus, the scope of the present invention should be construed not limited to the embodiments to be described herein. The embodiments are provided to better explain the present invention to those of ordinary skill in the art. The same reference number is given to the same element of the present invention, although it appears in different drawings. Further, the elements and areas of the drawings are drawn roughly only, and the scope of the present invention is not limited to the relative sizes and gaps in the drawings.

Figure 1A:
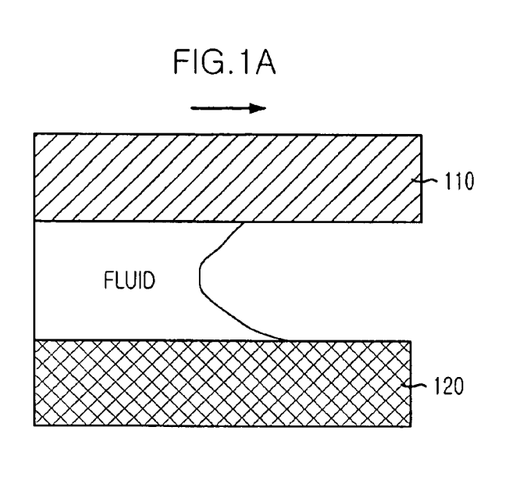
FIGS. 1A to 1C are cross-sectional views illustrating flow of micro fluid based on hydrophilicity of top and bottom substrates.
Figure 1B:
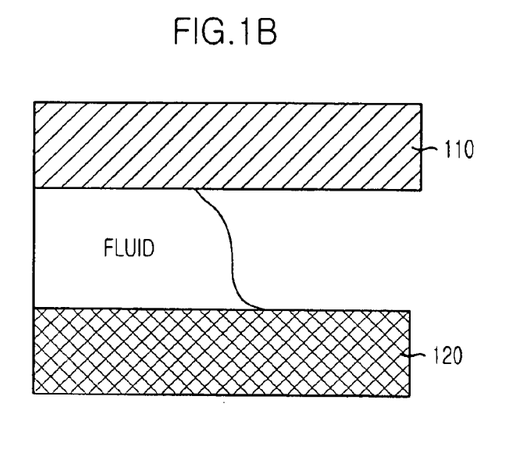
Figure 1C:
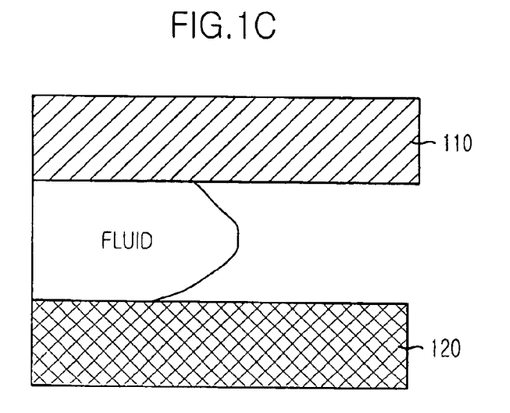

FIGS. 1A to 1C describes a principle of flowing of fluid based on a capillary phenomenon or a combination of a capillary pressure and external pressure. FIG. 1A shows a shape of the fluid at a line-end of the micro fluidic device, when a top substrate 110 and a bottom substrate 120 are all formed of hydrophilic materials. FIG. 1B illustrates a shape of the fluid at a line-end of the micro fluidic device, when the top substrate 110 is formed of a hydrophobic material and the bottom substrate 120 is formed of a hydrophilic material. FIG. 1C shows a shape of the fluid at a line-end of the micro fluidic device, when the top substrate 110 and the bottom substrate 120 are all formed of hydrophobic materials.

Referring to FIGS. 1A and 1B, if the flow channel has hydrophilicity stronger than the hydrophobicity, the fluid can flow. However, if the hydrophobicity is stronger than the hydrophilicity in the flow channel, which is shown in FIGS. 1B and 1C, additional pressure should be applied to make the fluid flow. In all cases, additional pressure may be applied.

Figure 2A:
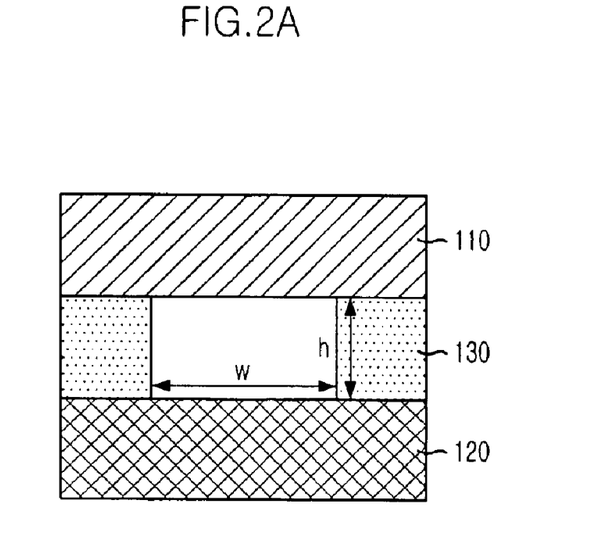
FIG. 2A is a cross-sectional view depicting a flow channel formed by the top substrate, the bottom substrate and a middle substrate.
Figure 2B:
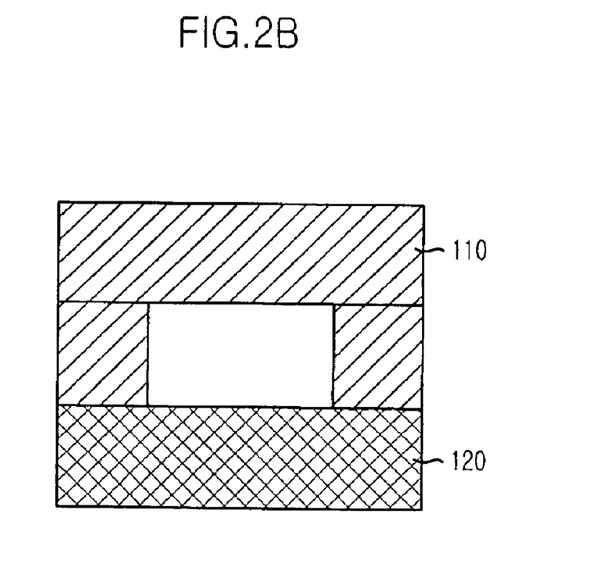
FIG. 2B is a cross-sectional view depicting a flow channel formed by the top and bottom substrates.

FIG. 2 shows cross sections of the flow channel used in the embodiments of the present invention. Referring to FIG. 2A, a middle substrate 130 is used additionally to form a flow channel, other than the top and bottom substrates 110 and 120. Referring to FIG. 2B, the flow channel is formed only by using the top and bottom substrates 110 and 120.

The top, middle and bottom substrates 110, 130 and 120 of the micro fluidic device can be formed of glass, plastic or metal but, mostly, they are formed of transparent polymers or a photoresist, such as SU-8, to which photolithography can be performed. The transparent polymers include polydimethylsiloxane (PDMS), polymethylmethacrylate (PMMA), polycarbonate (PC), cycloolefin copolymer (COC), polyamide (PA), polyethylene (PE), polypropylene (PP), polyphenylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), and perfluoralkoxyalkane (PFA).

The top substrate 110 of the micro fluidic device can be fabricated by using a metal or silicon structure as a master and performing hot embossing, injection molding, and casting. The metal or silicon structure can be formed by using a conventional machining method, such as laser ablation, rapid prototyping, and numerical control machining, or using a semiconductor processing method such as photolithography and etching. The substrates are joined by using a general adhesive, welding, performing supersonic wave joining, or using a glue adhesive according to the kind of materials. In FIG. 2A, an aspect ratio (w:h) is defined as a ratio of the width (w) and height (h) of the fluid in the flow channel.

Figure 3A:
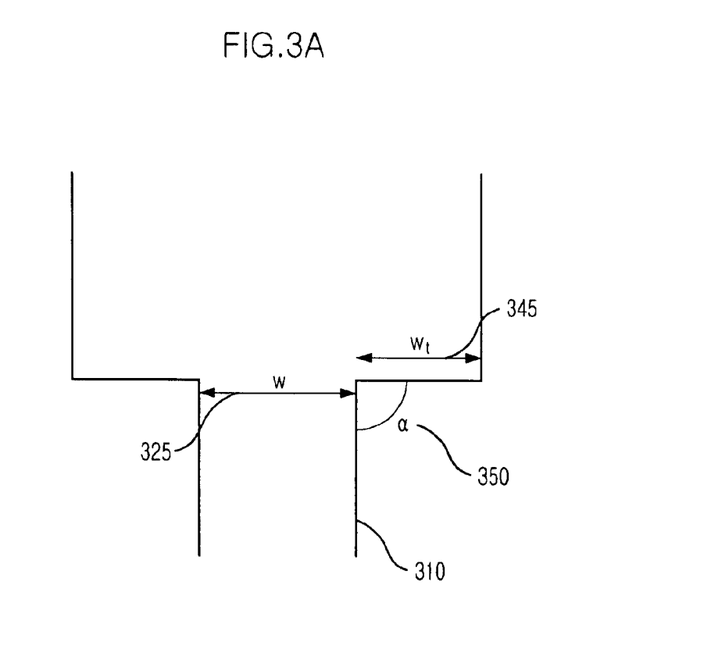
FIG. 3A is a plane figure describing a micro fluidic device in accordance with an embodiment of the present invention.

FIGS. 3A and 3B describe a basic operation of the micro fluidic device in accordance with an embodiment of the present invention. Referring to FIG. 3A, a micro flow channel 310 is connected with a flow blocking surface 325, and the flow blocking surface 325 forms a regular angle against a hump 345 for delaying the flow. The angle is called as a flow delay angle 350, an angle formed between a proceeding direction of the fluid and the hump for delaying the flow in the micro flow channel 310. The fluid flows through the flow channel 310 and, when it arrives at the flow blocking surface 325, it stops flowing temporarily by a pressure barrier due to a capillary phenomenon.

The fluid can flow by the sheer force of capillary phenomenon or by a combination of the capillary force and pressure from the outside. The principle that the fluid stops flowing temporarily at the time is described in the graph of FIG. 3B. When a pressure difference (Δp) is defined as a summation of the capillary force against atmospheric pressure and an external pressure, the pressure difference is designed as a negative value a little smaller than zero or a positive value a little larger than zero by adjusting the aspect ratio (w:h), which is a ratio of the width and height of the flow blocking surface 325, or a flow delay angle 350.

Figure 3B:
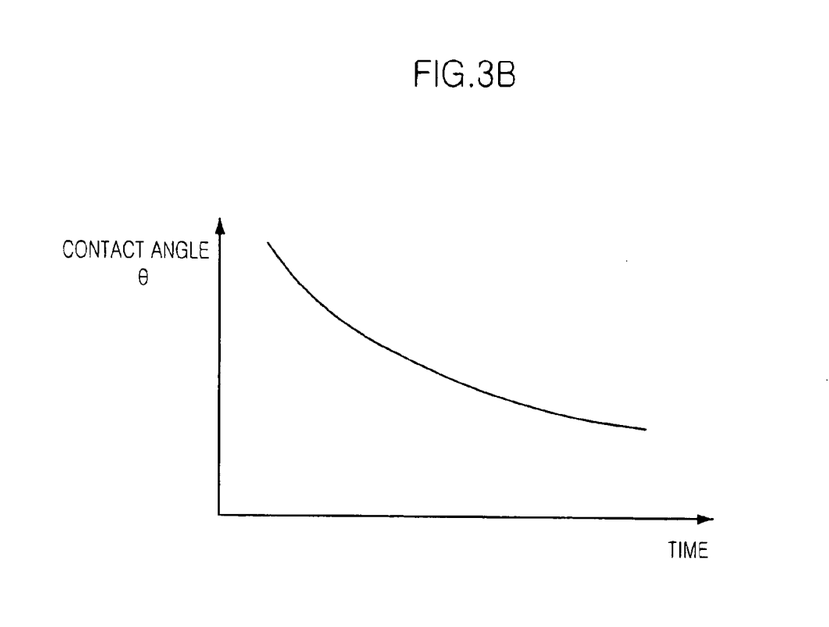
FIG. 3B is a graph depicting a change of a contact angle a fluid drop makes against a substrate according to time.

The pressure difference (Δp) is expressed as Equation 1 below.

$$\Delta p = \frac{a\sigma}{h}\left(\cos\theta_t + \cos\theta_b + \frac{\cos\theta_m}{w/h}\right) + \Delta p_{ext} \quad \text{Equation 1}$$

wherein a denotes a correction coefficient;

σ denotes surface tension;

w and h denote the width and height of the flow channel, respectively;

$\theta_t$, $\theta_m$, and $\theta_b$ denote contact angles between the fluid and the top, middle and bottom substrates; and $\Delta p_{ext}$ denotes pressure supplied from the outside.

Referring to FIG. 3C, since the contact angle is decreased as time passes, the pressure difference Δp is increased to a positive value gradually as time passes.

Figure 4A:
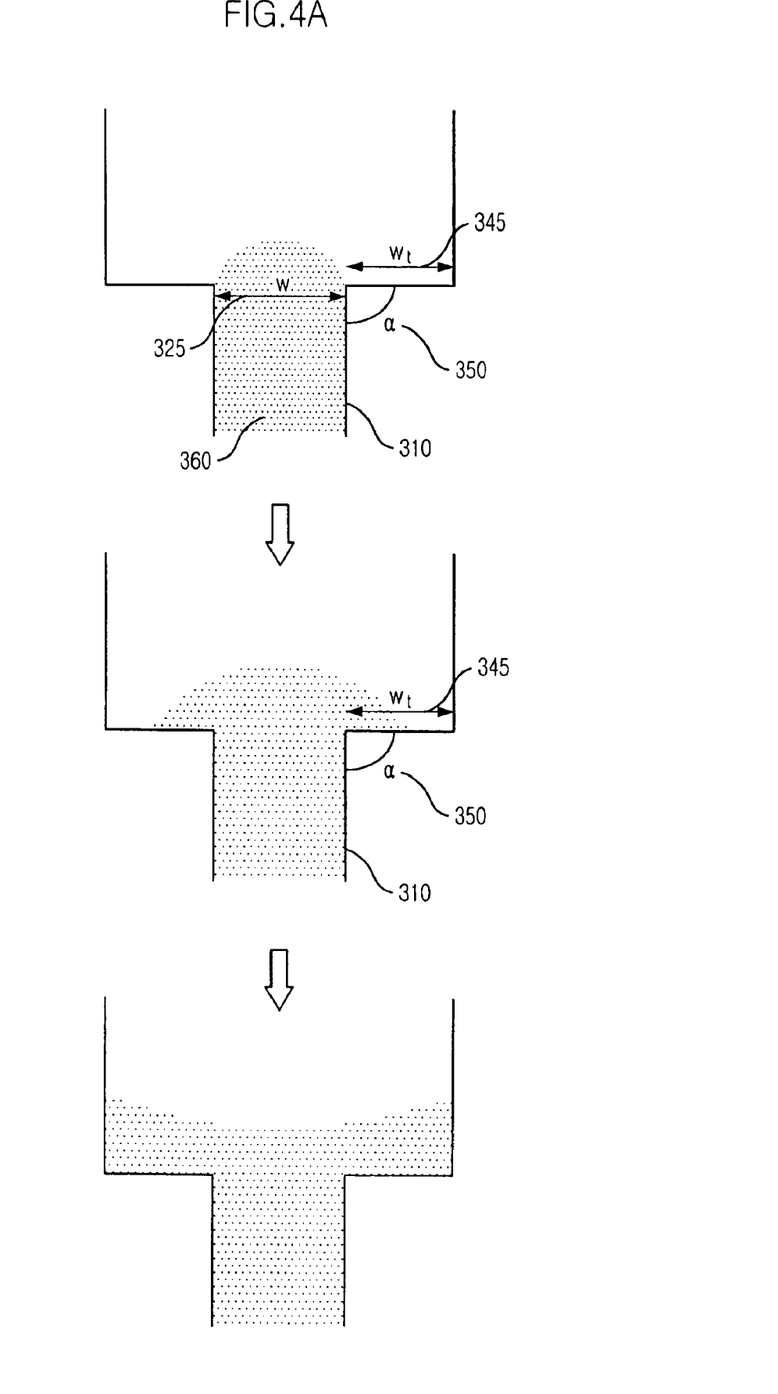
FIG. 4A shows plane figures describing a change of fluid at a line-end of the micro fluidic device shown in FIG. 3A when fluid is flown.

Referring to FIG. 4A, the flow delaying process in the micro fluidic device designed to have the above described structure is described. When the fluid that has passed through the flow channel 310 meets the flow blocking surface 325, it stops flowing temporarily. At the flow blocking surface 325, the fluid proceeds very slowly and, when it passes through the hump 345 and comes across a wall of the flow channel, the pressure difference is increased from the positive value until it reaches a normal speed.

Here, the flow delay time is determined based on the aspect ratio of the flow blocking surface, the flow delay angle 350, and the length $W_t$ of the hump for delaying the flow 345, after the kind of the top and bottom substrates and the kind of fluid are selected. By placing the pressure barrier behind the reaction chamber, the flow of the fluid can be delayed for a predetermined time even without mechanical or electrical valves and pumps.

Figure 4B:
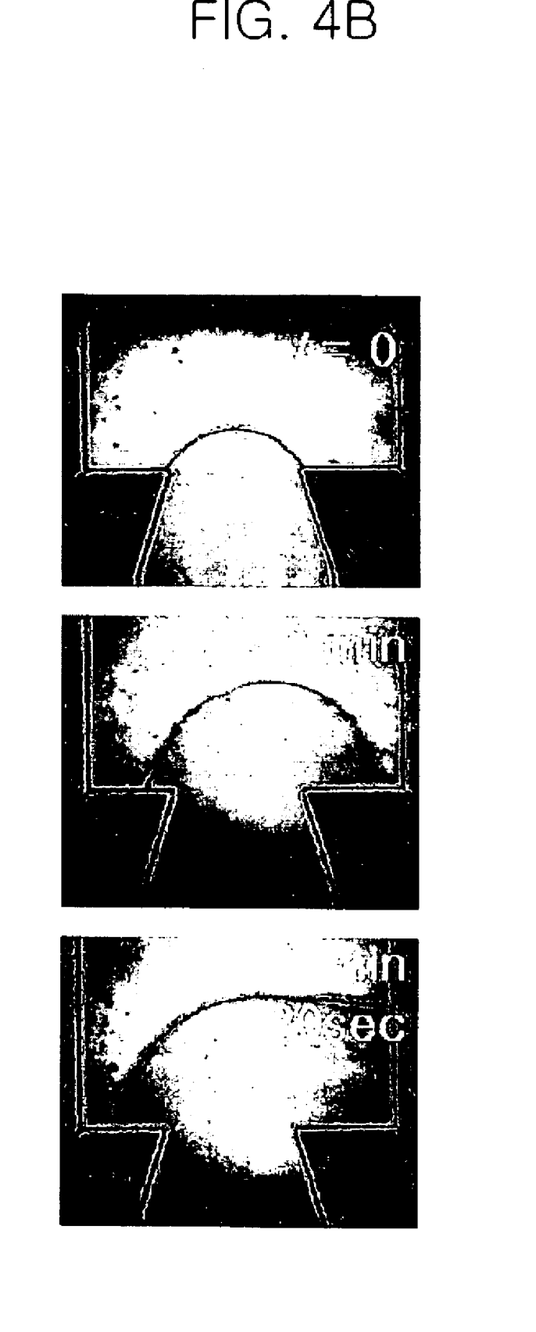
FIG. 4B presents photographs showing the time-based change of fluid in an actual micro fluidic device embodied according to the concept of FIG. 4A.

Referring to FIG. 4B, the concept of FIG. 4A is proven experimentally. FIG. 4B presents photographs showing how the shape of the fluid changes in an actual micro fluidic device, as time passes. When the top, middle and bottom substrates of the micro fluidic device are formed of PDMS, SU-8 and Si, respectively, and the fluid is deionized water, the flow delay time at the flow blocking surface appears to be about two minutes. Here, the width and height of the flow blocking surface 325 are designed to be 400 μm and 100 μm, respectively. According to the flow delaying process described above, time for chemical reaction in the reaction chamber can be secured sufficiently by delaying the flow of the fluid in the reaction chamber for chemical reaction between different or identical fluids or between solid and fluid. The flow delay time can be adjusted by controlling the aspect ratio of the flow blocking surface 325 and the hump 345 for delaying the flow.

Figure 5:
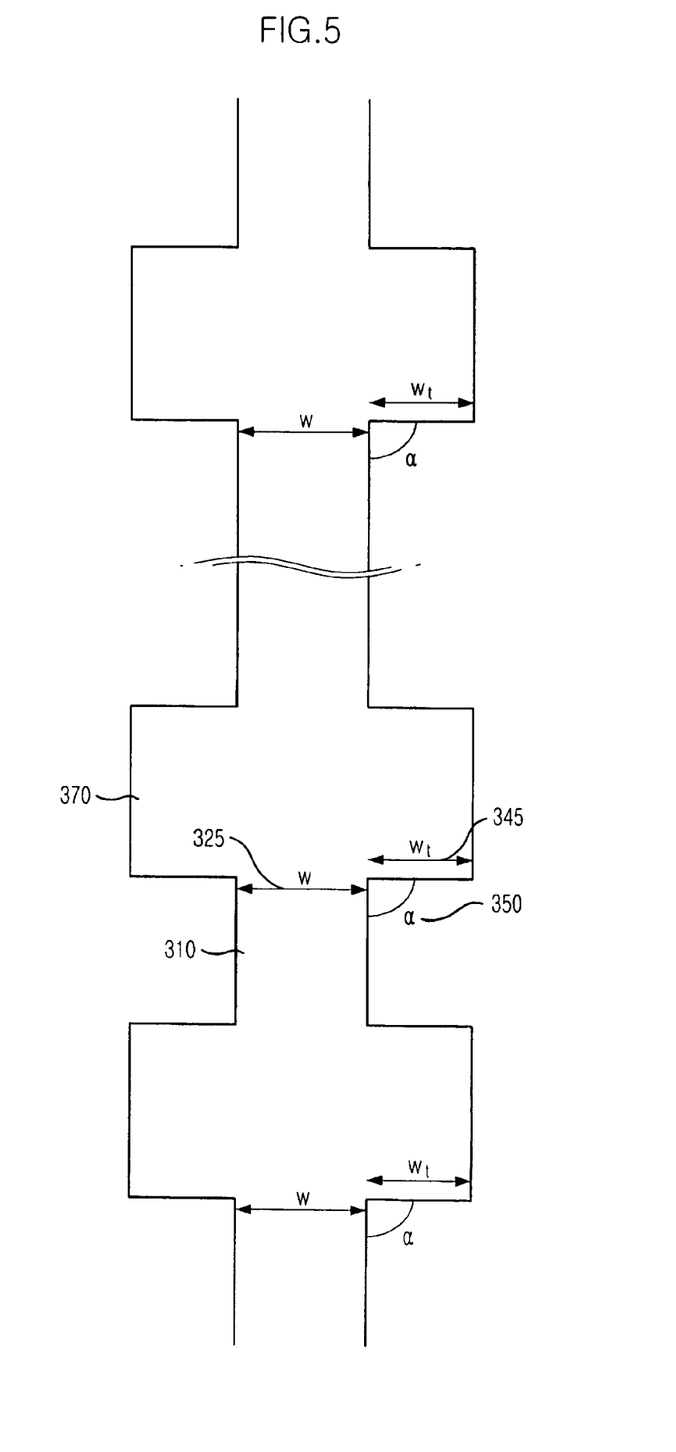
FIG. 5 shows plane figures illustrating a micro fluidic device formed by connecting a plurality of micro fluidic units in accordance with an embodiment of the present invention.

FIG. 5 shows a modified embodiment of the present invention. It shows that the flow delay time could be extended linearly by connecting the micro fluidic units, which are described in FIG. 3A, sequentially. The flow delay time can be extended as much as needed by adding the micro fluidic units.

Figure 6A:
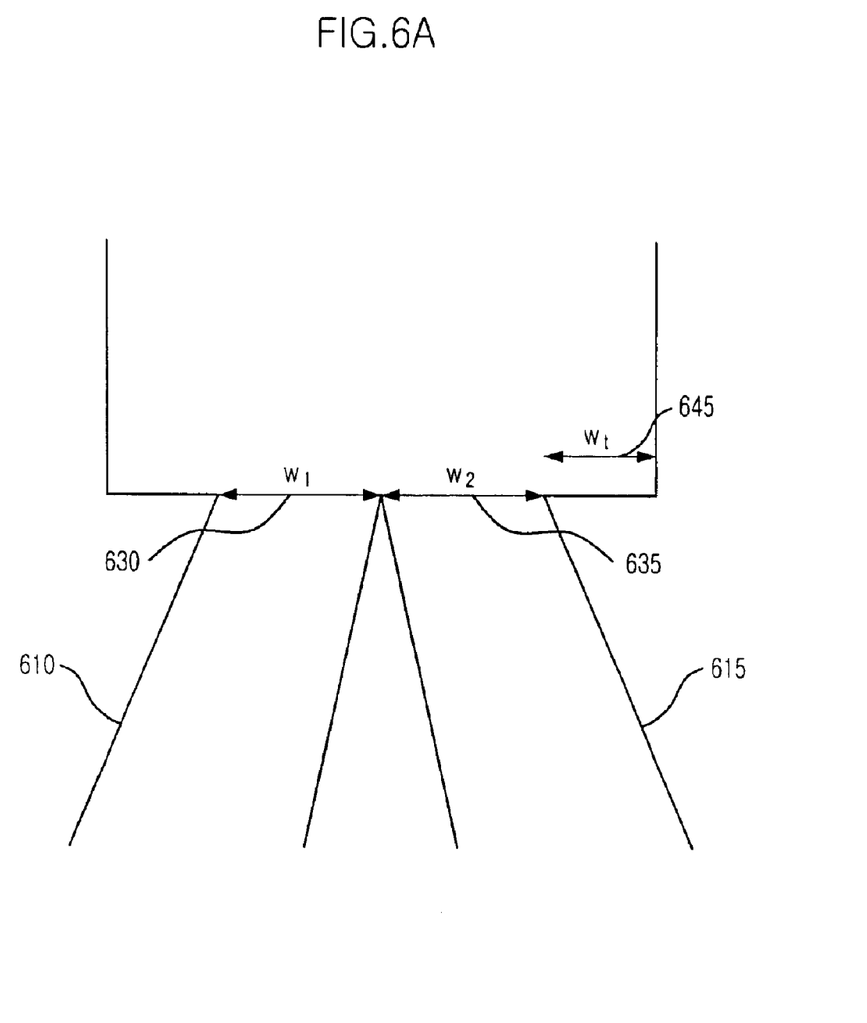
FIG. 6A is a plane figure describing sequential changes of fluid at a line-end of the micro fluidic device shown in FIG. 5, when the fluid is flown.
Figure 6B:
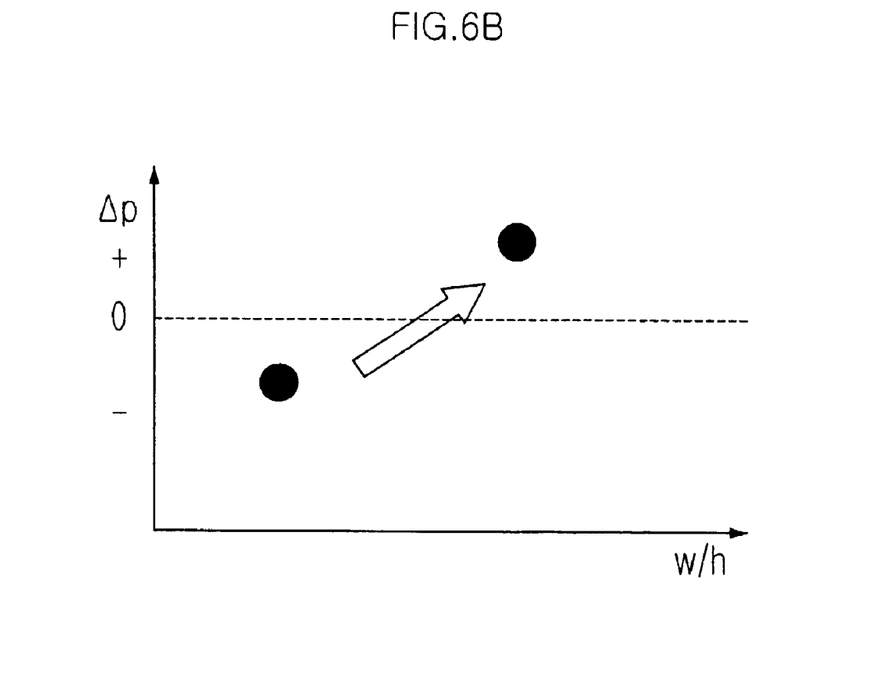
FIGS. 6B to 6D are graphs depicting a relationship between an aspect ratio of micro fluid and pressure difference in the micro fluidic device in accordance with the embodiment of the present invention.

Referring to FIG. 6A, the structure and basic principle of the micro fluidic device are described in accordance with yet another embodiment. The drawing shows a confluence junction where two flow channels meet. In the drawing, a first flow channel 610 and a second flow channel 615 meet a first flow blocking surface 630 and a second flow blocking surface 635, respectively.

Adjacent to the first flow blocking surface 630 and a second flow blocking surface 635, a hump 645 for delaying the flow is positioned. A first fluid 660 and a second fluid 665 that have passed through the first flow channel 610 and the second flow channel 615, respectively, reach the first flow blocking surface 630 and the second flow blocking surface 635. Here, if any one of the first fluid and the second fluid has arrived first, the pressure difference (Δp) is set to be a negative value a little smaller than zero or a value a little larger than zero.

Figure 7A:
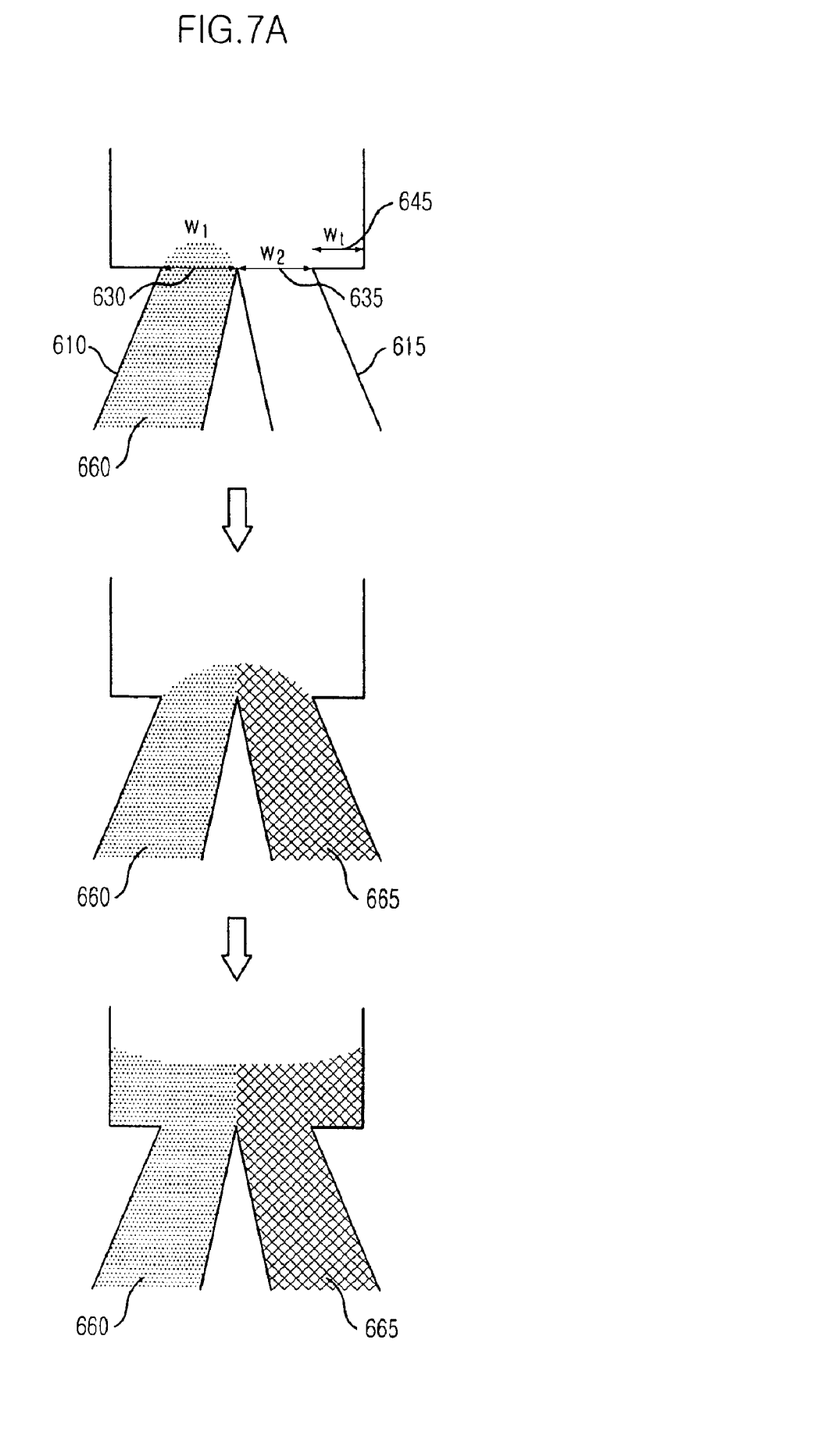
FIGS. 7A and 8A are plane figures illustrating sequential changes of fluid at a line-end of the micro fluidic device shown in FIG. 6A, when the fluid is flown.

If the pressure difference (Δp) is set to be a negative value, as illustrated in FIG. 7A, the first fluid 660 arrives at the first flow blocking surface 630 first and stops flowing. Then, when the second fluid 665 arrives at the second flow blocking surface 635 some time later, the two fluids get together and this makes the aspect ratio (w:h) increased twice as much as it used to be. Then, the pressure difference is changed to a positive value (refer to Equation 1) and, thus, the fluids start flowing through the flow blocking surfaces.

Figure 7B:
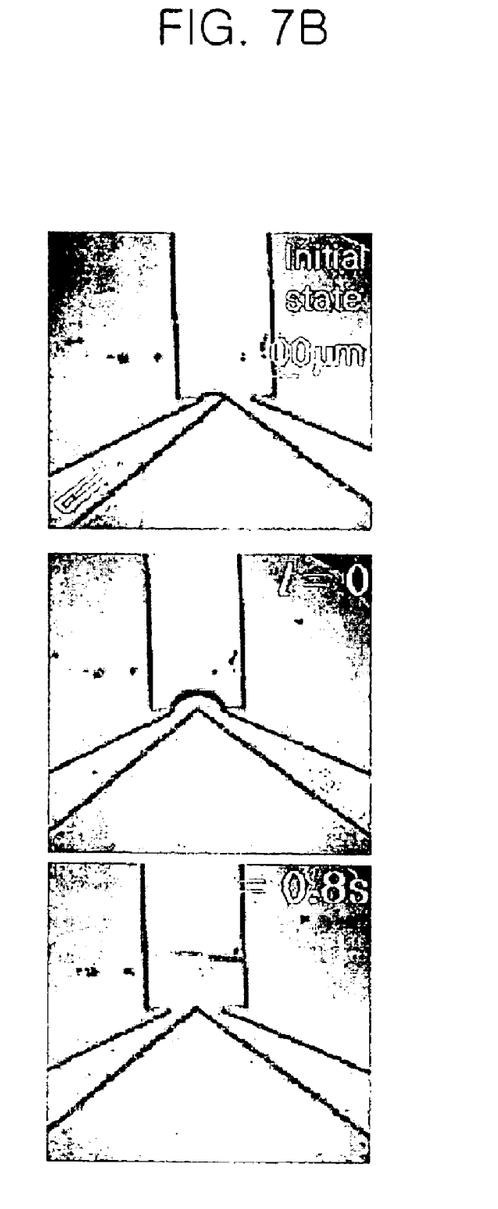
FIGS. 7B and 8B are photographs capturing a time-based flow of the fluid in an actual micro fluidic device embodied according to the concept of FIGS. 7A and 8A.

FIG. 7B shows photographs that prove the concept of FIG. 7A experimentally. The photographs show how the fluid flows in an actual micro fluidic device as time passes. Here, the top, middle and bottom substrates of the micro fluidic device are formed of plasma-processed PDMS, SU-8 and Si, respectively, and the fluid is deionized water. In the drawing, one fluid that has arrived first stops flowing at the flow blocking surface and passes through the flow blocking surface, only when the other fluid joins. Here, the width and height of the flow blocking surface are all 100 μm. In this method, no air bubble is formed in the confluence junction.

Figure 6C:
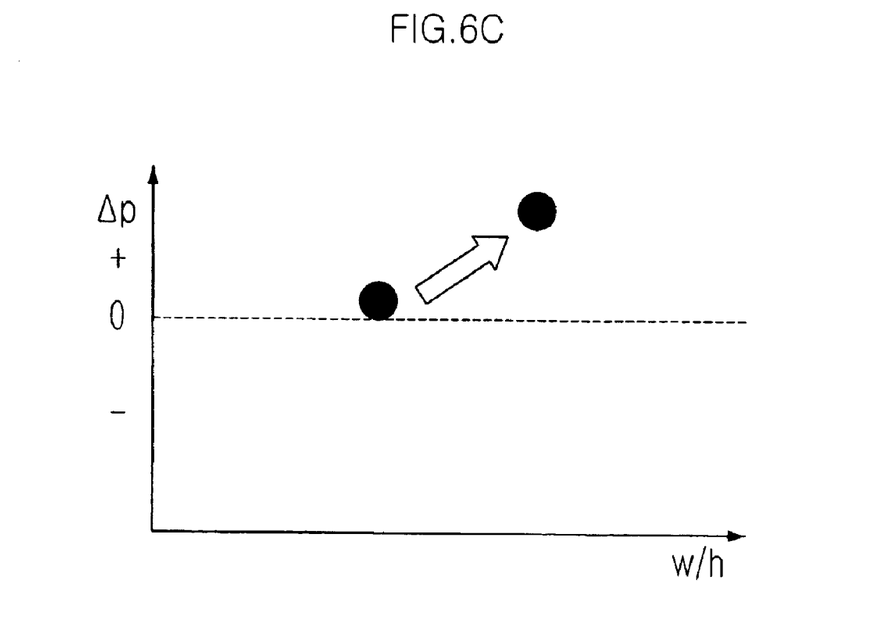
Figure 6D:
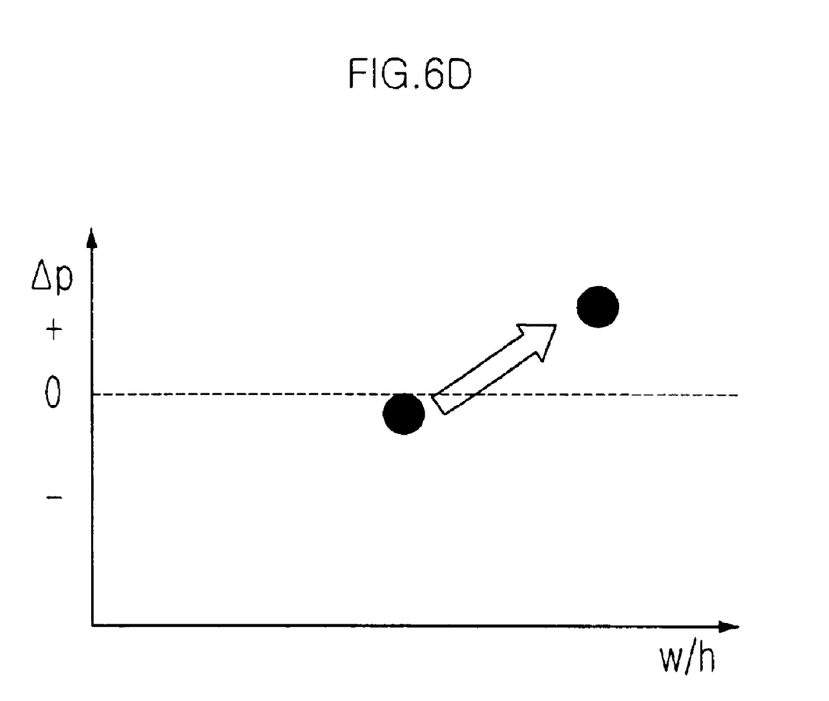
Figure 8A:
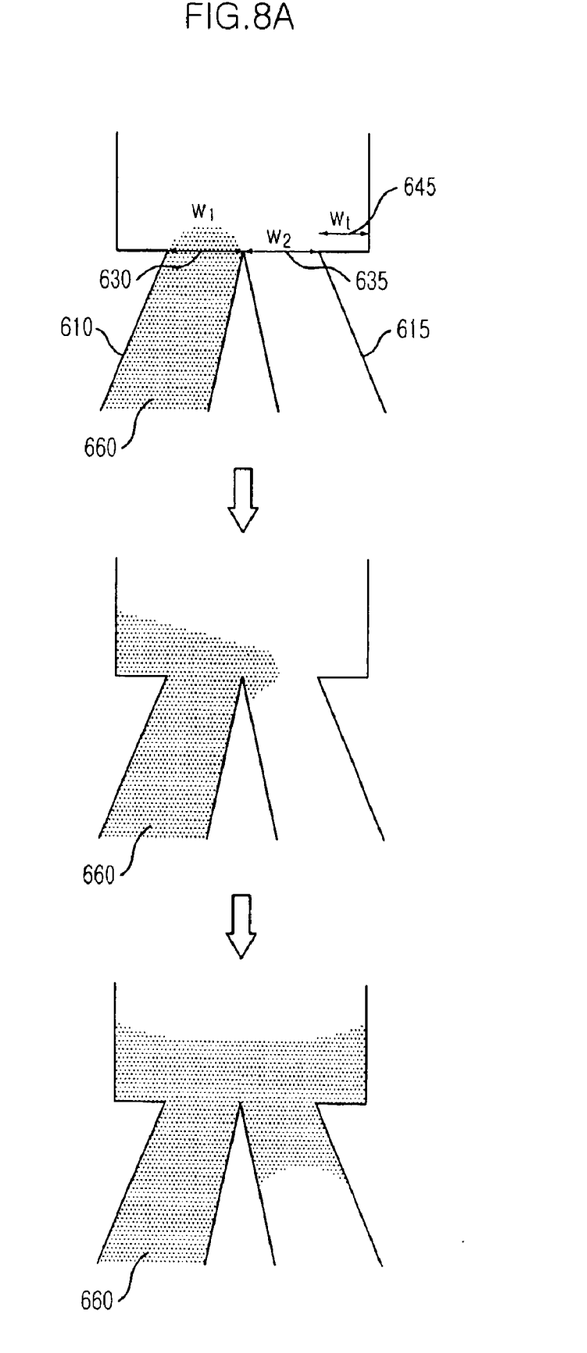

If the pressure difference is set to be a value a little larger than zero or a value a little smaller than zero (see FIGS. 6C and 6D), as shown in FIG. 8A, the first fluid 660 that has passed through the first flow blocking surface 630 temporarily stops flowing as long as necessary. Then, the amount of the first fluid 660 is increased gradually at a line-end of the micro fluidic device and, finally, meets a wall of the flow channel, fills in the flow channel, and proceeds ahead.

Figure 8B:
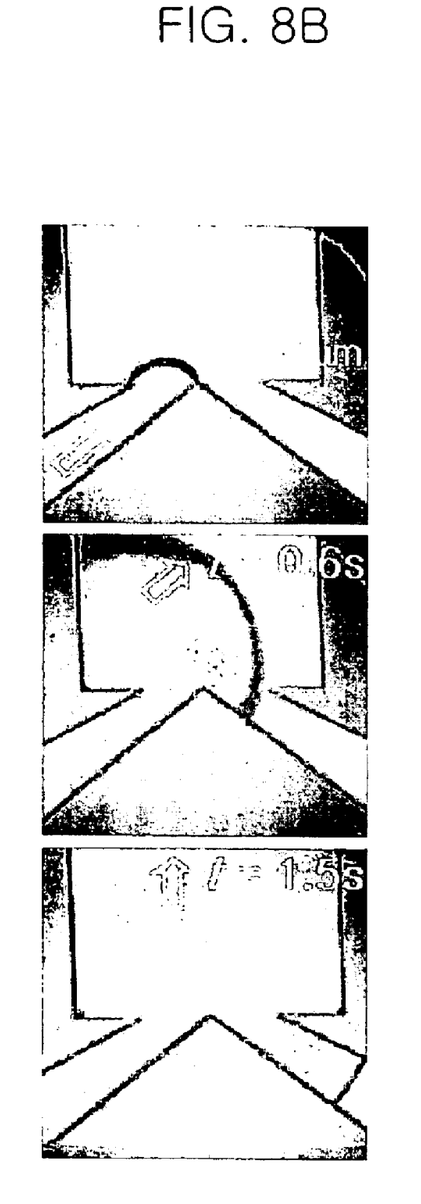

Even if the second flow channel 615 is contaminated or blocked, the first keeps flowing through the flow channel after a predetermined time. FIG. 8B proves the concept of FIG. 8A experimentally. The top, middle and bottom substrates of the micro fluidic device are formed of plasma-processed PDMS, SU-8 and Si, respectively, and the fluid is deionized water. In the drawing, the fluid that has arrived first at the flow blocking surface stops flowing temporarily and then passes through the flow blocking surface even if the other fluid does not arrive there. The width and height of the flow blocking surface are designed to be 250 μm and 100 μm, respectively. In this method, although one flow channel is blocked, it is possible to flow a fluid through the other flow channel without any additional pump.

Figure 9A:
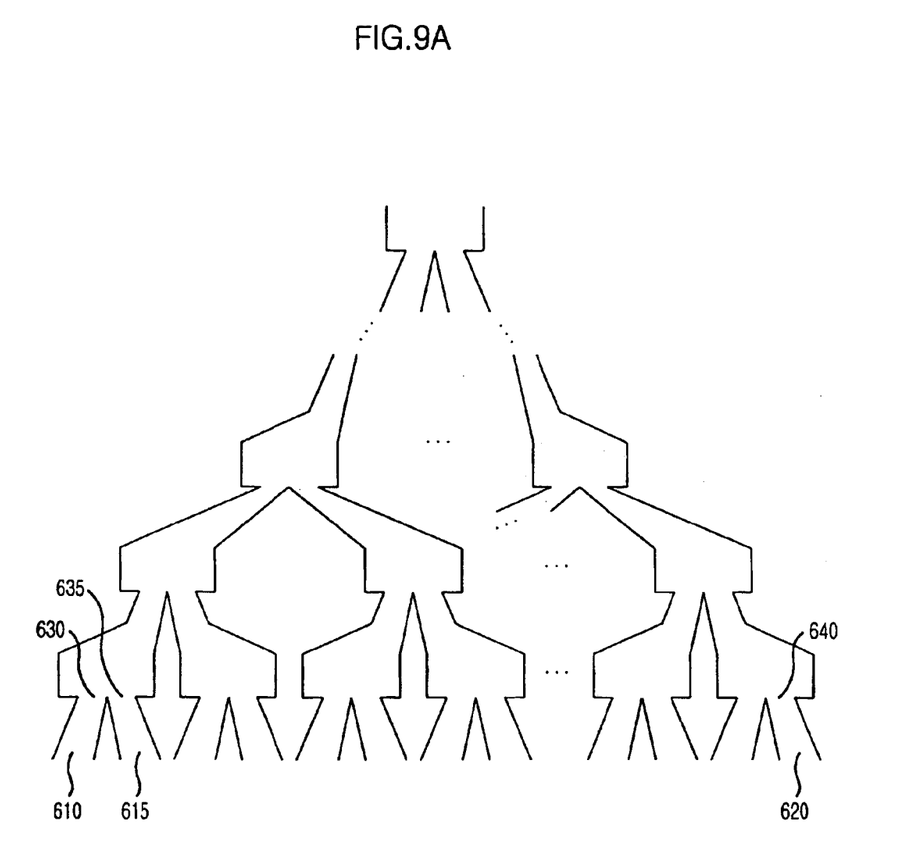
FIGS. 9A and 9B are schematic views showing a micro fluidic device which is formed by connecting micro fluidic units in serial and/or in parallel in accordance with the present invention.
Figure 9B:
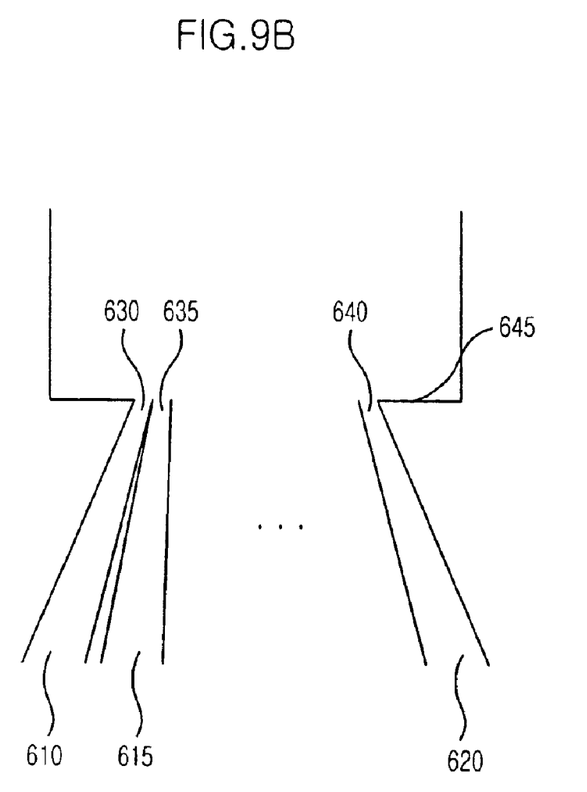

FIGS. 9A and 9B are schematic views showing a micro fluidic device which is formed by connecting micro fluidic units in serial and/or in parallel in accordance with the present invention. The micro fluidic units include two flow channels getting together in a confluence junction, which is shown in FIG. 6A, two flow blocking surfaces, and two humps for delaying the flow.

According to the structure of FIGS. 9A and 9B, the number of flow channels can be extended by connecting the micro fluidic units of the micro fluidic device suggested in FIG. 6A gradually. FIG. 9A shows flow channels extended up to n flow channels from a first flow channel 610 to an $n^{th}$ flow channel 620 by connecting the flow channels with each other indirectly. FIG. 9B shows the flow channels extended up to n flow channels by connecting the flow channels directly.

As described above, the micro fluidic device of the present invention can delay the flow time. Also, when two fluids, different or identical, flow through different flow channels it can prevent the formation of air bubbles by making the fluids flow only when they meet at a desired spot. Although part of the different or identical fluids do not meet each other, one fluid can start flowing again after a predetermined time. In addition, the micro fluidic device of the present invention can delay the flow of the fluids in a reaction chamber for chemical reaction between the different or identical fluids or between solid and fluid as much time as needed.

While the present invention has been described with respect to certain preferred embodiments, it will be apparent to those skilled in the art that various changes and modifications may be made without departing from the scope of the invention as defined in the following claims.

What is claimed is:

1. A micro fluidic device capable of controlling a flow time of micro fluid by using a capillary phenomenon, comprising:
   a flow channel for flowing fluid, the flow channel being formed between a top substrate and a bottom substrate or between a top substrate, a bottom substrate, and a middle substrate;
   a flow blocking surface for stopping a flow of the fluid in the flow channel temporarily; and
   a hump for delaying the flow formed in the line of continuity with the flow blocking surface.

2. The micro fluidic device as recited in claim 1, wherein a width and a height of the flow blocking surface are adjusted based on kinds of the top, bottom, middle substrates and fluid in order to stop flowing of the fluid at the flow blocking surface temporarily.

3. The micro fluidic device as recited in claim 1, wherein the flow of the fluid is adjusted by controlling a length of the hump for delaying the flow, a flow delay angle between a proceeding direction of the flow channel and the hump for delaying the flow, and an aspect ratio (width : height) of the flow blocking surface, based on kinds of the top, bottom, middle substrates and fluid.

4. The micro fluidic device as recited in claim 1, wherein more than two micro fluidic units are connected sequentially, the micro fluidic units including the flow blocking surface and the hump for delaying the flow.

5. A micro fluidic device capable of controlling a flow time of micro fluid by using a capillary phenomenon, comprising:
   a first flow channel for flowing a first fluid and a second flow channel for flowing a second fluid, the first and second flow channels being formed between a top substrate and a bottom substrate or between a top substrate, a bottom substrate and a middle substrate;
   a first flow blocking surface and a second flow blocking surface, each connected to the first flow channel and the second flow channel; and
   a hump for delaying the flow, the hump being formed in a line of continuity with the first and second flow blocking surfaces.

6. The micro fluidic device as recited in claim 5, wherein, a flow delay angle between a proceeding direction of the flow channel and the hump for delaying the flow, an aspect ratio (width : height) of the flow blocking surface, and a length of the hump for delaying the flow are controlled based on kinds of the top, bottom, middle substrates and fluids so that one fluid that has arrived at the flow blocking surface first stops flowing temporarily until the other fluid arrives, among the fluids flown through the first flow channel and the second flow channel.

7. The micro fluidic device as recited in claim 5, wherein a flow delay angle between a proceeding direction of the flow channel and the hump for delaying the flow, an aspect ratio (width : height) of the flow blocking surface, and a length of the hump for delaying the flow are controlled based on kinds of the top, bottom, middle substrates and fluids so that one fluid that has arrived at the flow blocking surface first stops flowing temporarily and then passes through the flow blocking surface after a predetermined time, even if the other fluid does not arrive, among the fluids flown through the first flow channel and the second flow channel.

8. The micro fluidic device as recited in claim 5, wherein a plurality of fluidic units are connected in parallel or in serial, the fluidic units including the first flow blocking surface and the second flow blocking surface, and the hump for delaying the flow.

* * * * *